(12) United States Patent
Iwata

(10) Patent No.: US 12,345,296 B2
(45) Date of Patent: Jul. 1, 2025

(54) SLIDING MEMBER AND METHOD OF MANUFACTURING THE SAME

(71) Applicant: DAIDO METAL COMPANY LTD., Aichi (JP)

(72) Inventor: Tsuyoshi Iwata, Inuyama (JP)

(73) Assignee: DAIDO METAL COMPANY LTD., Aichi (JP)

( * ) Notice: Subject to any disclaimer, the term of this patent is extended or adjusted under 35 U.S.C. 154(b) by 594 days.

(21) Appl. No.: 17/189,746

(22) Filed: Mar. 2, 2021

(65) Prior Publication Data
US 2021/0285492 A1    Sep. 16, 2021

(30) Foreign Application Priority Data

Mar. 11, 2020 (JP) .................................. 2020-041876
Jan. 25, 2021 (JP) .................................. 2021-009546

(51) Int. Cl.
F16C 33/20       (2006.01)

(52) U.S. Cl.
CPC .......... *F16C 33/205* (2013.01); *F16C 33/208* (2013.01); *F16C 2202/04* (2013.01); *F16C 2208/02* (2013.01); *F16C 2208/32* (2013.01); *Y10T 428/24942* (2015.01); *Y10T 428/2982* (2015.01)

(58) Field of Classification Search
CPC .. F16C 33/205; F16C 33/208; F16C 2202/04; F16C 2208/02; F16C 2208/32; Y10T 428/24942; Y10T 428/2982
See application file for complete search history.

(56) References Cited

U.S. PATENT DOCUMENTS

| | | | | |
|---|---|---|---|---|
| 2005/0139064 A1* | 6/2005 | Hakamata | ............... | F16C 33/20 92/71 |
| 2006/0194021 A1* | 8/2006 | Takeda | .................... | C08L 27/18 428/327 |
| 2011/0148064 A1* | 6/2011 | Yanase | ............... | C10M 169/044 428/550 |
| 2012/0008887 A1* | 1/2012 | Adam | ................... | B32B 27/286 427/195 |
| 2014/0187721 A1* | 7/2014 | Ito | ......................... | C08L 101/00 525/151 |

FOREIGN PATENT DOCUMENTS

| CN | 1312330 A | 9/2001 |
|---|---|---|
| CN | 1641003 A | 7/2005 |
| CN | 1764795 A | 4/2006 |
| CN | 101408224 A | 4/2009 |

(Continued)

OTHER PUBLICATIONS

JP-06307453-A Machine Translation (Year: 1994).*

(Continued)

*Primary Examiner* — Travis M Figg
(74) *Attorney, Agent, or Firm* — KARCESKI IP LAW, PLLC

(57) ABSTRACT

A sliding member includes a resin layer that slides with a mating member. The resin layer contains polytetrafluoroethylene and an additive. The resin layer includes a plurality of rich regions formed in a thickness direction of the resin layer, the rich regions having a higher concentration of the polytetrafluoroethylene than other regions.

8 Claims, 12 Drawing Sheets

(56) References Cited

FOREIGN PATENT DOCUMENTS

| | | | |
|---|---|---|---|
| CN | 102271906 | A | 12/2011 |
| CN | 103534317 | A | 1/2014 |
| CN | 108571519 | A | 9/2018 |
| JP | S60261062 | A | 12/1985 |
| JP | 06307453 | A * | 11/1994 |
| JP | H06307453 | A | 11/1994 |
| JP | 3636326 | B1 | 4/2005 |
| JP | 2015187617 | A | 7/2005 |
| JP | 2006097720 | A | 4/2006 |
| JP | 2010052385 | A | 3/2010 |
| JP | 2013194104 | A | 9/2013 |
| JP | 2016164216 | A | 9/2016 |
| KR | 20050065434 | A * | 6/2005 |
| KR | 20110099707 | A | 9/2011 |

OTHER PUBLICATIONS

Chinese Office Action dated Aug. 31, 2022, for Chinese Patent Application No. 202110257522.X.
Japanese Office Action dated Sep. 6, 2022, for Japanese Patent Application No. 2021-009546.
Japanese Office Action dated Mar. 14, 2023, for Japanese Patent Application No. 2021 009546.
Korean Office Action dated Jul. 18, 2022, for Korean Patent Application No. 10-2021-0030025.
Japanese Office Action dated Nov. 28, 2023, for Japanese Patent Application No. 2021-9546.

* cited by examiner

SLIDING DIRECTION

Fig. 7

| ITEMS | CONDITIONS | UNITS |
|---|---|---|
| LOAD | 6.9 | N |
| SLIDING SPEED | 5.0 | mm/sec |
| MEASURED DISTANCE | 5.0 | mm |
| STEEL BALL MATERIAL | SUS304 | — |
| STEEL BALL DIAMETER | φ8.0 | mm |
| LUBRICANT | Neutral100 | — |

Fig. 8

| | ADDITIVE | RICH REGION | | | | | | COEFFICIENT OF DYNAMIC FRICTION | WEAR RESISTANCE |
|---|---|---|---|---|---|---|---|---|---|
| | | PROPORTION vol% | MINOR AXIS μm | MAJOR AXIS μm | ASPECT RATIO | | | | |
| | | | | | AVERAGE | MINIMUM | MAXIMUM | | |
| EXAMPLE 1 | CALCIUM FLUORIDE | 12 | 1.3~9.2 | 10.7~160 | 49 | 5 | 95 | 0.026 | ○ |
| EXAMPLE 2 | CALCIUM FLUORIDE | 31 | 2.3~16.3 | 16.2~94.3 | 16 | 6 | 77 | 0.022 | ○ |
| EXAMPLE 3 | BARIUM SULPHATE | 18 | 2.4~17.6 | 10.8~128 | 37 | 4 | 82 | 0.023 | ◎ |
| EXAMPLE 4 | BARIUM SULPHATE | 29 | 1.6~19.2 | 14.4~108 | 11 | 7 | 62 | 0.020 | ○ |
| EXAMPLE 5 | TITANIUM OXIDE | 22 | 0.7~12.6 | 9.6~125 | 43 | 6 | 107 | 0.025 | ○ |
| EXAMPLE 6 | TITANIUM OXIDE | 49 | 1.6~32.0 | 6.4~88.2 | 25 | 4 | 87 | 0.023 | ○ |
| EXAMPLE 7 | IRON OXIDE | 30 | 2.3~20.4 | 9.4~125 | 20 | 5 | 45 | 0.021 | ◎ |
| EXAMPLE 8 | CALCIUM FLUORIDE | 3 | 0.2~1.0 | 1.6~5.5 | 5 | 2 | 20 | 0.034 | ○ |
| EXAMPLE 9 | BARIUM SULPHATE | 20 | 2.0~18.5 | 12.7~119 | 8 | 3 | 28 | 0.031 | ○ |
| EXAMPLE 10 | CALCIUM FLUORIDE | 44 | 0.1~0.6 | 2.2~89.5 | 36 | 5 | 89 | 0.035 | ○ |
| EXAMPLE 11 | BARIUM SULPHATE | 55 | 2.2~19.5 | 13.5~135 | 23 | 4 | 74 | 0.036 | ○ |
| COMPARATIVE EXAMPLE 1 | CALCIUM FLUORIDE | — | — | — | — | — | — | 0.040 | ○ |
| COMPARATIVE EXAMPLE 2 | BARIUM SULPHATE | — | — | — | — | — | — | 0.038 | ○ |

Fig. 9

| | R(%) at P=100 | MAXIMUM VALUE | | COEFFICIENT OF DYNAMIC FRICTION | WEAR RESISTANCE |
| --- | --- | --- | --- | --- | --- |
| | | R(%) | P | | |
| EXAMPLE 12 | 20 | 70 | 50 | 0.023 | ◎ |
| EXAMPLE 13 | 40 | 73 | 65 | 0.021 | ◎ |
| EXAMPLE 14 | 38 | 70,71 | 40,65 | 0.020 | ◎ |
| EXAMPLE 15 | 33 | 83 | 40 | 0.019 | ◎ |
| EXAMPLE 16 | 50 | 80 | 40 | 0.020 | ◎ |

Fig. 11

| P | Px | EXAMPLE 12 | EXAMPLE 13 | EXAMPLE 14 | EXAMPLE 15 | EXAMPLE 16 |
|---|---|---|---|---|---|---|
| | | R(%) | R(%) | R(%) | R(%) | R(%) |
| 0 | — | 3 | 5 | 4 | 5 | 6 |
| 5 | — | 5 | 7 | 8 | 10 | 11 |
| 10 | — | 10 | 13 | 12 | 14 | 15 |
| 15 | — | 30 | 28 | 25 | 33 | 31 |
| 20 | — | 40 | 34 | 43 | 45 | 43 |
| 25 | — | 45 | 37 | 53 | 53 | 54 |
| 30 | 0.0 | 50 | 40 | 59 | 63 | 64 |
| 35 | 7.1 | 55 | 45 | 65 | 75 | 77 |
| 40 | 14.3 | 60 | 50 | 70 | 83 | 80 |
| 45 | 21.4 | 65 | 55 | 65 | 71 | 78 |
| 50 | 28.6 | 70 | 60 | 60 | 75 | 73 |
| 55 | 35.7 | 65 | 65 | 62 | 70 | 71 |
| 60 | 42.9 | 60 | 70 | 67 | 65 | 68 |
| 65 | 50.0 | 55 | 73 | 71 | 60 | 65 |
| 70 | 57.1 | 50 | 73 | 65 | 55 | 62 |
| 75 | 64.3 | 47 | 68 | 60 | 50 | 60 |
| 80 | 71.4 | 43 | 60 | 55 | 45 | 58 |
| 85 | 78.6 | 40 | 55 | 50 | 40 | 56 |
| 90 | 85.7 | 35 | 50 | 45 | 38 | 54 |
| 95 | 92.9 | 30 | 45 | 40 | 35 | 52 |
| 100 | 100.0 | 20 | 40 | 38 | 33 | 50 |

SLIDING MEMBER AND METHOD OF MANUFACTURING THE SAME

CROSS-REFERENCE TO RELATED APPLICATION(S)

This application is based on and claims priority to Japanese Patent Application No. 2020-041876, filed on Mar. 11, 2020, and Japanese Patent Application No. 2021-009546, filed on Jan. 25, 2021, the entire contents of both of which are incorporated herein by reference.

FIELD OF THE INVENTION

The present invention relates to a sliding member and a method of manufacturing the sliding member.

DESCRIPTION OF THE RELATED ART

Some sliding members are provided with a resin layer on a sliding surface side that slides with a mating member. The resin layer is generally made of resin having a small coefficient of friction to reduce a frictional resistance. On the other hand, since resin has lower wear resistance than metal, improvement of the wear resistance has been made by adding of additives. In Japanese Patent Laid-Open No. 2013-194104, resin is added with inorganic substances having a cleavage property, and thus the increase in coefficient of friction during steady wear is prevented and the improvement of wear resistance is made.

Such additives are uniformly dispersed in the resin that is a base material forming a resin layer. When the additives are uniformly dispersed into the resin, the coefficient of friction and the wear resistance of the resin layer are improved. However, there is a problem in that an optimum value for reduction of the coefficient of friction and wear resistance is not always attained in regard to the uniform dispersion of the additives, resulting in insufficient performance of the resin layer.

Therefore, the present invention aims to provide a sliding member and a method of manufacturing the sliding member that allow for highly achieving both reduction of coefficient of friction and wear resistance and improving performance of a resin layer by control of a dispersion of an additive in the resin layer.

SUMMARY OF THE INVENTION

In order to solve the above problem, a sliding member of the present embodiment includes a resin layer on a sliding surface that slides with a mating member. The resin layer contains polytetrafluoroethylene and an additive, and includes a plurality of rich regions formed in a thickness direction of the resin layer, the rich regions having a higher concentration of the polytetrafluoroethylene than other regions.

The resin layer contains the polytetrafluoroethylene (PTFE) and the additive. Since the PTFE and the additive are unevenly dispersed, the resin layer has the rich regions in which a concentration of the PTFE is higher than that in other regions. In other words, when the PTFE and the additive are unevenly dispersed, the resin layer is formed with the rich regions in which a concentration of the additive is low and the concentration of the PTFE is high as compared with the other regions. In the present embodiment, the resin layer includes the plurality of rich regions formed in the thickness direction of the resin layer. In other words, according to the present embodiment, the resin layer includes the plurality of regions in which the concentration of the PTFE changes in the thickness direction. Thus, the rich regions having a high concentration of the PTFE contribute to the reduction of the coefficient of friction which is an inherent performance of the PTFE. Since the rich regions have the high concentration of the PTFE, the coefficient of friction is greatly reduced. On the other hand, the resin layer other than the rich regions richly contains the additive rather than the PTFE. Therefore, the resin layer other than the rich regions contributes to the improvement of the strength of the resin layer. In the present embodiment, the PTFE and the additive are unevenly distributed in the resin layer by intent, and thus the region of the PTFE of light and shade is formed. Then, both the reduction of the coefficient of friction and the wear resistance are highly achieved by the intentional light and shade of the PTFE. Therefore, the performance of the resin layer can be sufficiently exhibited, and both the reduction of the coefficient of friction and the wear resistance can be achieved at the same time.

In the present embodiment, the resin layer contains 10 to 50 vol % of the rich regions.

In the present embodiment, the resin layer includes the rich regions formed in layers in the thickness direction of the resin layer.

In the present embodiment, an average value of aspect ratios of the rich regions in the resin layer is 10 to 65 in an arbitrary observation field of view in a cross section in a plate thickness direction perpendicular to a sliding direction of the mating member.

In the present embodiment, each of the rich regions has a minor axis and a major axis perpendicular to the minor axis in the observation field of view, and the minor axis has a length of 0.7 to 32 μm.

Thus, both the reduction of the coefficient of friction and the wear resistance can be stably achieved.

In the present embodiment, the rich region proportion R (%) in the resin layer differs depending on the resin depth position P.

In this case, the rich region proportion R (%) is larger than a value at P=100 in at least a part of a range where the resin depth position P is 0<P<100.

Further, the rich region proportion R (%) has a maximum value in a region where the resin depth position P is 40≤P≤70.

Thus, both the reduction of the coefficient of friction and the wear resistance can be further stably achieved.

A method of manufacturing the sliding member according to the present embodiment includes a step of removing at least a part of the formed resin layer in the thickness direction from an end surface.

Thus, in the sliding member, not only the end surface of the formed resin layer but also the surface obtained by partially removing a part from the end surface in the thickness direction can be used as the sliding surface.

BRIEF DESCRIPTION OF THE DRAWINGS

FIG. 7 is a schematic view showing test conditions of the sliding member according to the embodiment;

FIG. 8 is a schematic view showing test results of Examples and Comparative Examples of the sliding member according to the embodiment;

FIG. 9 is a schematic view showing test results of Examples of the sliding member according to the embodiment;

FIG. 11 is a schematic view showing a relation between the resin depth position P and the rich region proportion R (%) in Examples of the sliding member according to the embodiment.

DETAILED DESCRIPTION OF THE PREFERRED EMBODIMENT

A sliding member according to an embodiment will be described below with reference to the drawings.

Figure 1:
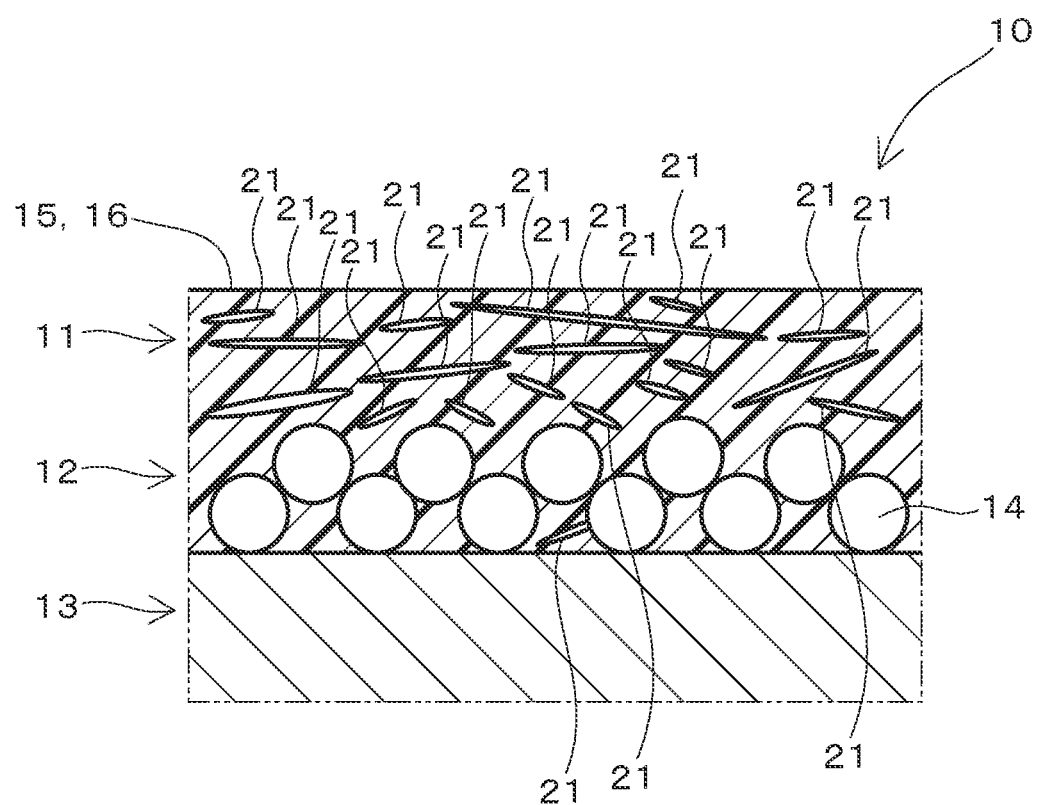
FIG. 1 is a schematic cross-sectional view showing a sliding member according to an embodiment.

As shown in FIG. 1, a sliding member 10 includes a resin layer 11, an intermediate layer 12, a back metal layer 13. The resin layer 11 contains polytetrafluoroethylene (PTFE) and an additive. The intermediate layer 12 is provided between the resin layer 11 and the back metal layer 13. The intermediate layer 12 is a porous layer obtained by sintering of metal particles 14 such as copper. The resin layer 11 is formed on a side opposite to the back metal layer 13 on the porous intermediate layer 12, and is impregnated into the intermediate layer 12. Thus, the resin layer 11 partially reaches the back metal layer 13 while being impregnated into the intermediate layer 12. The back metal layer 13 is formed of a metal such as iron or steel or an or alloy thereof. The sliding member 10 includes an end surface 15 on a surface of the resin layer 11, that is, on a side opposite to the back metal layer 13 on the resin layer 11. The sliding member 10 uses the end surface 15 of the resin layer 11 or a surface of which the resin layer 11 is exposed by being partially removed in a thickness direction, as a sliding surface 16. In other words, when the resin layer 11 is used as it is, the end surface 15 serves as the sliding surface 16. In addition, when the resin layer 11 is partially removed in the thickness direction, the exposed surface after the removal can also be used as the sliding surface 16. In the case of FIG. 1, the resin layer 11 maintains the thickness at the time of formation, and the end surface 15 and the sliding surface 16 coincide with each other.

Figure 2:
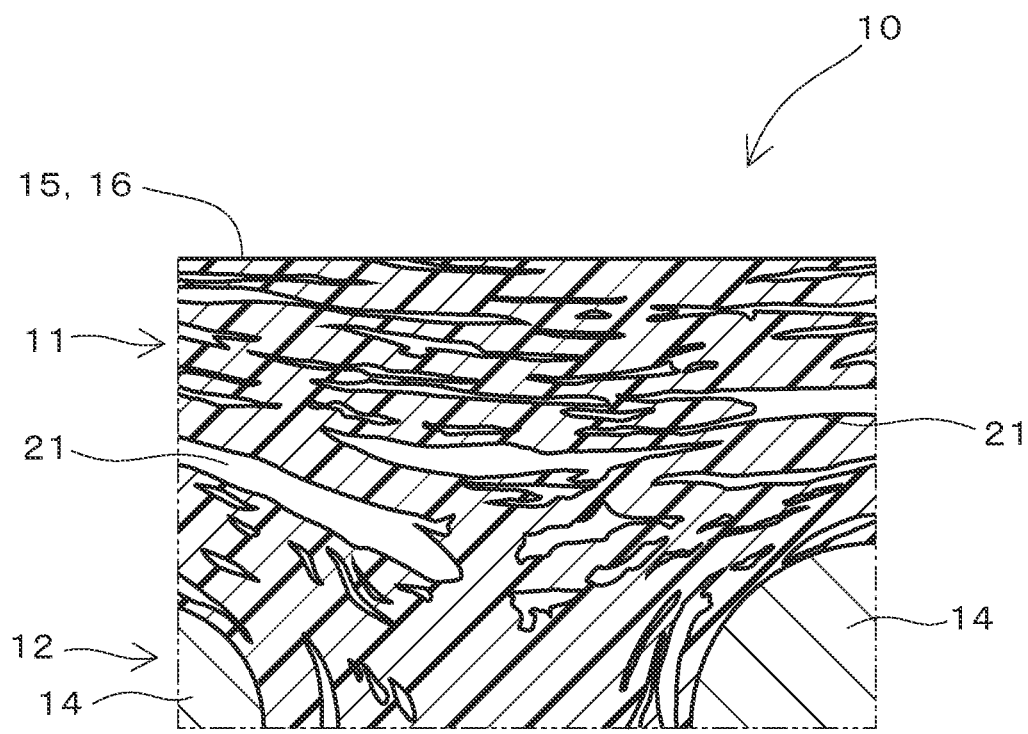
FIG. 2 is a schematic cross-sectional view showing based on an enlarged microscope image of a main part of the sliding member according to the embodiment.

The resin layer 11 contains the PTFE and the additive as described above. The resin layer 11 includes rich regions 21. Each rich region 21 is a region having a higher concentration of PTFE than other regions of the resin layer 11. In other words, the resin layer 11 has a distribution in concentrations of the PTFE and the additive, and includes the rich regions 21 in which the concentration of the PTFE is relatively high. In the case of the present embodiment, the rich regions 21 are each defined as a region in which the concentration of the PTFE is 3 mass % or more than that in other regions, that is, a region in which the PTFE is concentrated by as much as 3 mass % or more compared with other regions. In this case, the concentration of the PTFE in the rich regions 21 is preferably 80 mass % to 100 mass %. As an example, the concentration of the PTFE in the rich regions 21 is 93 mass %, and the concentration of the PTFE in other regions is 90 mass %. The resin layer 11 includes the rich regions 21 of 10 to 50 vol %, and more preferably 20 to 45 vol %. A plurality of rich regions 21 are formed in the thickness direction of the resin layer 11. As described above, in the sliding member 10 of the present embodiment, the PTFE and the additive are not uniform in the resin layer 11 and the rich regions 21 having a high concentration of PTFE exist. As shown in FIG. 2, the resin layer 11 includes the plurality of rich regions 21 formed in layers in the thickness direction. In other words, the resin layer 11 is in a state in which the rich regions 21 and the other regions are alternately stacked in layers in the thickness direction. In FIG. 2, for the sake of simplicity, only some of the rich regions 21 are denoted by reference numerals, and regions without hatching are the rich regions 21.

Figure 3:
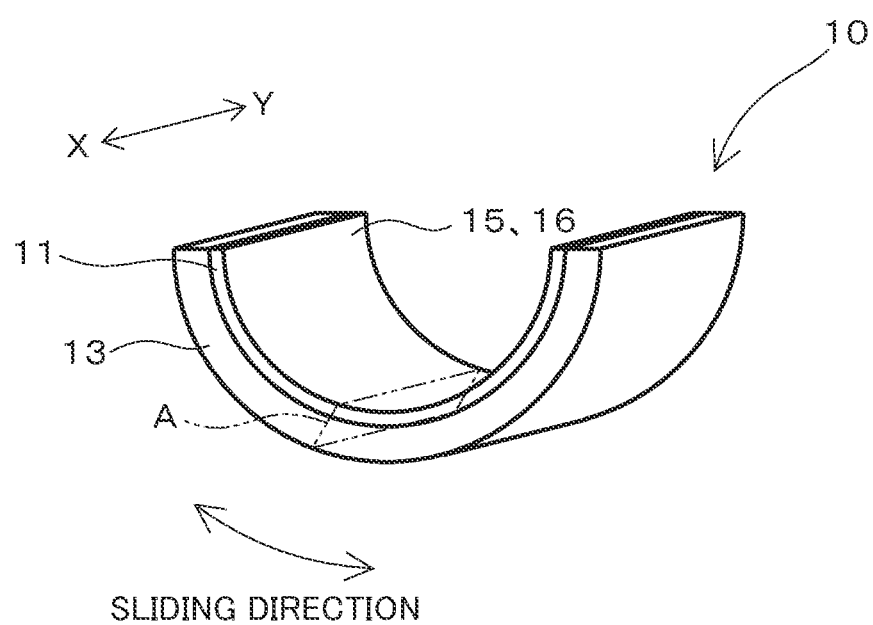
FIG. 3 is a schematic perspective view showing the sliding member according to the embodiment.

Each rich region 21 has an average aspect ratio of 10 to 65 in an arbitrary observation field of view. The aspect ratio of the rich region 21 is more preferably 20 to 50. The aspect ratio is calculated by a length of major axis/a length of a minor axis of the rich region 21. The observation field of view is perpendicular with respect to a sliding direction in which the sliding member 10 and a mating member slide, and is set to a cross section obtained by cutting the resin layer 11 in the thickness direction. In other words, when the sliding member 10 is formed in a semi-cylindrical shape or a cylindrical shape as shown in FIG. 3, the sliding member 10 has an inner circumferential surface, which is the sliding surface 16, and a circumferential direction which is the sliding direction. Therefore, the observation field of view is set at a position corresponding to A in FIG. 3. Further, the sliding member 10 may slide in an axial direction, that is, in an X-Y direction of FIG. 3, depending on an object to be applied. The observation field of view is set to 200 μm×200 μm, for example.

In such an observation field of view, each rich region 21 has a flat shape as shown in FIGS. 1 and 2 with the aspect ratio as described above. The rich regions 21 each have a minor axis and a major axis due to the flat shape in the observation field of view. The minor axis and the major axis are perpendicular to each other. A length of the minor axis of each rich region 21 is 0.7 to 32 μm, and more preferably 1 to 20 μm. As described above, the rich regions 21 each have the flat shape in the observation field of view. Further, the aspect ratio of the rich regions 21 is smaller than that in an observation field of view that is the cross section in the direction perpendicular to the observation field of view. In other words, each rich region 21 has a flat elongated shape when viewed from the sliding surface 16.

The additive is dispersed in the resin layer 11. In the case of the present embodiment, the resin layer 11 includes the rich regions 21 having a relatively high concentration of PTFE. Therefore, the concentration of the additive contained in the resin layer 11 is relatively reduced in the rich regions 21 as compared with surroundings. The additive contained in the resin layer 11 contributes to improvement of wear resistance of resin layer 11. The additive preferably has a Mohs hardness of about 3 to 6. Particularly, the additive preferably has a hardness close to that of the mating member. When iron is used as the mating member, the Mohs hardness of the additive is preferably set to about 5 to 6. An example of the additive includes inorganic compounds, for example, calcium fluoride, titanium oxide, iron oxide, barium sulfate, calcium carbonate, molybdenum disulfide, and zinc sulfide. An example of the additive may include one kind or two or more kinds of these inorganic compounds. The additive preferably has a particle size of about 0.3 to 5 μm. When the particle size of the additive is excessively small, the additive tends to agglomerate. For this reason, the additive having an excessively small particle size hinders the formation of the rich regions 21 in the resin layer 11. In addition, when the particle size of the additive is excessively large, the additive tends to bite into the rich regions 21. For this reason, the additive having an excessively large particle size hinders the formation of the rich regions 21 in the resin layer 11.

Figure 4:
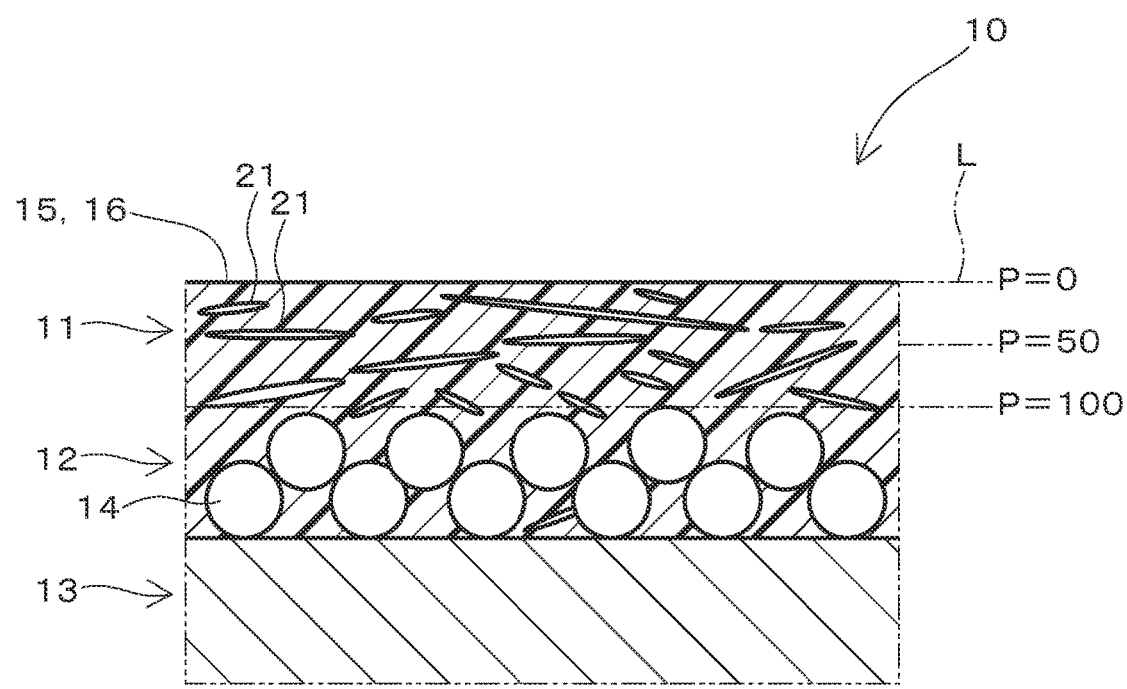
FIG. 4 is a schematic cross-sectional view showing the sliding member according to the embodiment.

The sliding member 10 of the present embodiment defines a resin depth position P in the observation field of view described above. The resin depth position P is defined in the thickness direction of the resin layer 11 in the observation field of view. The resin layer 11 is formed in layers, and thus has two ends in the thickness direction. Specifically, the resin layer 11 has an end on the mating member and an end on the back metal layer 13 on the opposite side thereof. In the case of the present embodiment, the resin layer 11 includes the end surface 15, which is the end on the mating member, on the opposite side to the back metal layer 13 as shown in FIG. 4. In the example shown in FIG. 4, the end surface 15 forms the sliding surface 16.

Here, the resin depth position P is defined as P=0 at the end surface 15 of the resin layer 11. Further, the resin depth position P is defined as P=100 at the end on the opposite side to the end surface 15 in the thickness direction of the resin layer 11. In the case of the sliding member 10 including the intermediate layer 12 as in the present embodiment, a position where the resin depth position P is 100 (P=100) is a boundary between the resin layer 11 and the intermediate layer 12. When the resin layer 11 is impregnated into the metal particles 14 forming the intermediate layer 12 as in the present embodiment, the resin depth position P in the resin layer 11 closest to the metal particles 14 is set as P=100, as shown in FIG. 4.

In addition, a virtual straight line L is set in the observation field of view. The virtual straight line L is perpendicular to the thickness direction of the resin layer 11. In other words, the virtual straight line L is parallel to the end surface 15 in the observation field of view. As described above, the virtual straight line L is set to be perpendicular to the thickness direction of the resin layer 11, that is, parallel to the end surface 15 in the range of the resin depth position P being 0≤P≤100. For example, when the resin depth position P is 50 (P=50) as shown in FIG. 4, the virtual straight line L is set to be perpendicular to the thickness direction of the resin layer 11 at P=50.

Figure 5:
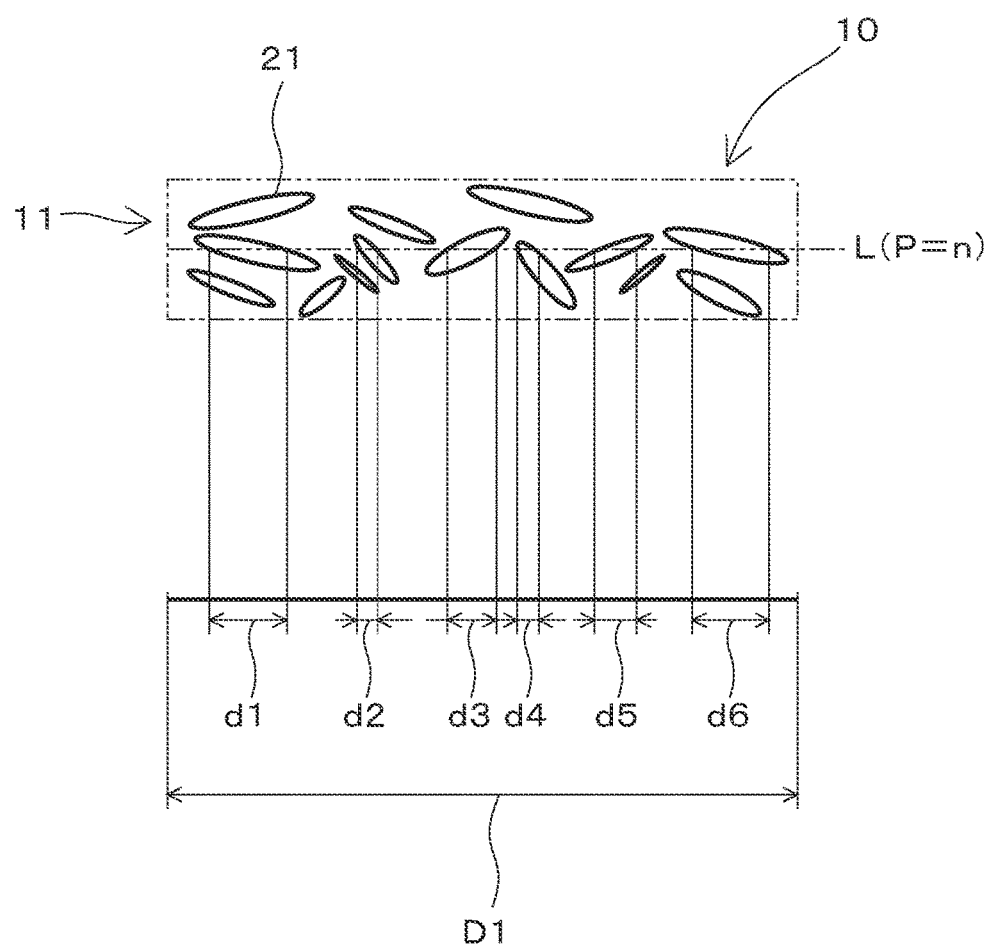
FIG. 5 is a schematic view for describing a rich region proportion R (%) when a resin depth position P is P=n in the sliding member according to the embodiment.

The rich regions 21 of the resin layer 11 are continuously or intermittently located on the virtual straight line L. In other words, as shown in FIG. 5, the resin layer 11 includes the rich regions 21 and other regions on the virtual straight line L of P=n (0≤n≤100). Here, a proportion of the rich regions 21 on the virtual straight line L is calculated as a rich region proportion R (%). When a total length of the resin layer 11 on the virtual straight line L is defined as D1 and a total length of the rich regions 21 on the virtual straight line L is defined as D2, the rich region proportion R (%) is calculated as R (%)=D2/D1×100.

As a specific example, in the case of the example shown in FIG. 5, six rich regions 21 exist on the virtual straight line L. When lengths of these rich regions 21 are defined as d1, d2, d3, d4, d5, and d6, respectively, in a length direction of the virtual straight line L, the total length D2 is calculated as D2=d1+d2+d3+d4+d5+d6. Then, the rich region proportion R (%) is calculated as R=D2/D1×100 from the total length D1 of the resin layer 11 and the total length D2 of the rich regions 21 on the virtual straight line L in the observation field of view. Note that FIG. 5 is an example for description, and the number of rich regions 21 on the virtual straight line L may naturally be more than six or less than six.

Figure 6:
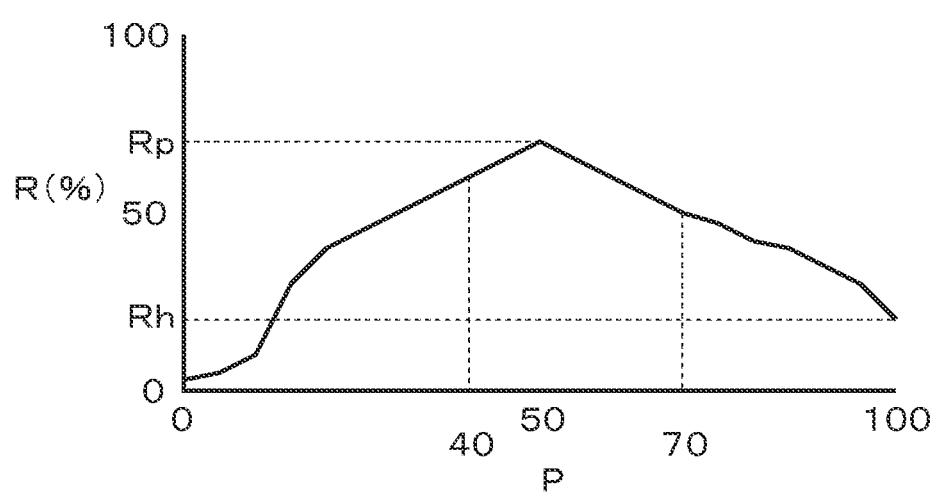
FIG. 6 is a schematic view for describing a relation between the resin depth position P and the rich region proportion R (%) in the sliding member according to the embodiment.

When the rich region proportion R (%) is defined as described above, the rich region proportion R (%) differs depending on the resin depth position P as shown in FIG. 6. The rich region proportion R (%) is larger than a value Rh at P=100 in at least a part of the range where the resin depth position P is 0<P<100. In other words, the rich region proportion R (%) has a maximum value Rp larger than the value Rh at P=100 in the range where the resin depth position P is 0<P<100. For example, as shown in FIG. 6, the rich region proportion R (%) has the maximum value Rp larger than the value Rh at P=100 in the range from 0 to 100 of the resin depth position P. In this case, the rich region proportion R (%) preferably has the maximum value Rp in the region where the resin depth position P is 40≤P≤70.

A method of manufacturing the resin layer 11 according to the above configuration will be described below.

Prior to the formation of the resin layer 11, the PTFE and the additive are stirred and mixed. As the PTFE forming the resin layer 11, fine powder is used which is a granulated powder. The fine powder PTFE has an average particle size of 300 to 800 μm. As described above, the fine powder PTFE has a sufficiently large size as compared with the additive having a particle size of about 0.3 to 5 μm. Therefore, when the PTFE and the additive forming the resin layer 11 are mixed in the power state, the fine powder of the additive adheres to the PTFE particles to cover surfaces thereof. The obtained solid mixture is added into a petroleum-based solvent. In this case, 25 mass % of the solvent is added based on 100 mass % of the solid mixture of the PTFE and the additive. A mixing weight ratio of the solid mixture and the solvent can be arbitrarily changed. The solid mixture of the PTFE and the additive becomes a wet mixture, which is in a solvent-wetted state, by adding of the solvent.

The wet mixture is applied to a base material in which the intermediate layer 12 is laminated on the back metal layer 13. At this time, the wet mixture is applied to the base material while being pressurized by a roller, for example. Thus, a surface of the base material is coated with the wet mixture. When the wet mixture is applied to the base material while being pressurized, the PTFE particles contained in the solid mixture are spread in a state where the additive adheres to the surface. When the pressure is adjusted by the roller, a direction is determined in which the PTFE particles are spread. When the PTFE particles are spread in the state where the additive adheres, the additive is sandwiched between the PTFE particles. As a result, the coated layer of the wet mixture is in a state where the rich regions 21 having a high concentration of PTFE are stacked in a plurality of layers in the thickness direction. The base material coated with the wet mixture is heated to remove the solvent contained in the wet mixture. After the solvent is removed, the resin layer 11 is fixed to the base material by firing. The base material formed with the resin layer 11 is formed in a cylindrical shape or a semi-cylindrical shape, for example, and is used as the sliding member 10.

The sliding member 10 formed by the above procedure is used in a state where the resin layer 11 faces the mating member. In this case, the resin layer 11 can be used with the formed thickness as it is. In this case, the end surface 15 of the resin layer 11 serves as the sliding surface 16. Further, after being formed, the resin layer 11 may be used in a state of be partially removed from end surface 15. For example, the resin layer 11 is removed by as much as about 10 to 50% from the end surface 15 in the thickness direction. In this case, the surface of the resin layer 11 exposed by the removal serves as the sliding surface 16. The removal is performed by any method, for example, cutting or griding.

Examples of the sliding member 10 according to the above-described embodiment will be described below.

Each of Examples 1 to 16 indicates the sliding member 10 according to present embodiment. In other words, in Examples 1 to 16, the resin layer 11 includes the rich regions 21. On the other hand, each of Comparative Examples 1 and 2 indicates a sliding member in which the resin layer 11 does not include the rich regions 21. In other words, in Comparative Examples 1 and 2, the PTFE and the additive forming the resin layer 11 are uniformly distributed as in the sliding member according to the prior art.

(Test Conditions)

The sliding member 10 was tested using a Bowden-Leben type testing machine. As shown in FIG. 7, test conditions were as follows: a stainless steel ball having a diameter of 8 mm applied with a load of 6.9 N was reciprocated 20 times with a sliding speed of 5 mm/sec over a distance of 5 mm on a test piece. Then, average values of coefficients of dynamic friction was measured at the time of 15 to 20 reciprocations out of 20 reciprocations, and the measured average values were taken as coefficients of dynamic friction shown in FIGS. 8 and 9. Wear resistance having the same amount of wear as Comparative Examples 1 and 2 as conventional examples was marked with a single circle, and wear resistance having the amount of wear, which was reduced by as much as 30% or more as compared with Comparative Examples 1 and 2, was marked with a double circle.

In each of Examples and Comparative Examples shown in FIG. 8, an average aspect ratio was calculated in such a manner of extracting the rich regions 21 included in the resin layer 11 in any observation field of view of 200 μm×200 μm. At this time, five rich regions 21 having the maximum value and five rich regions 21 having the minimum value in the observation field of view were excluded from calculation targets. As the number of the rich regions 21 in the observation field of view increases, the number of the rich regions 21 having a long minor axis tends to increase. Therefore, as the number of the rich regions 21 in the observation field of view increases, the average value of the aspect ratios tends to decrease.

As shown in FIG. 8, from Examples 1 to 11 in which the resin layer 11 includes the rich regions 21 as compared with Comparative Examples 1 and 2 in which a uniform resin layer is provided, it can be seen that a coefficient of dynamic friction is reduced while wear resistance is maintained. Particularly, from Examples 1 to 11, it can be seen that the coefficient of dynamic friction is reduced when the proportion of the rich regions 21 is 10 to 50 vol %. Then, it can be seen that the coefficient of dynamic friction is further reduced when the proportion of the rich regions 21 is 20 to 45 vol %.

Further, it can be seen that the aspect ratio of the rich regions 21 contributes to the reduction of the coefficient of dynamic friction when the aspect ratio is 10 to 65. It can be seen that the rich regions 21 having the minor axis and the major axis contribute to the reduction of the coefficient of dynamic friction when the length of the minor axis 0.7 to 32 μm. On the other hand, it can be seen that the additive contained in the resin layer 11 has a small effect on the reduction of the coefficient of dynamic friction.

As described above, the sliding member 10, in which the resin layer 11 includes the rich regions 21, of the present embodiment, can maintain the wear resistance and reduce the coefficient of dynamic friction at same time as compared with the conventional resin layer in which the PTFE and the additive are uniformly dispersed.

Figure 10:
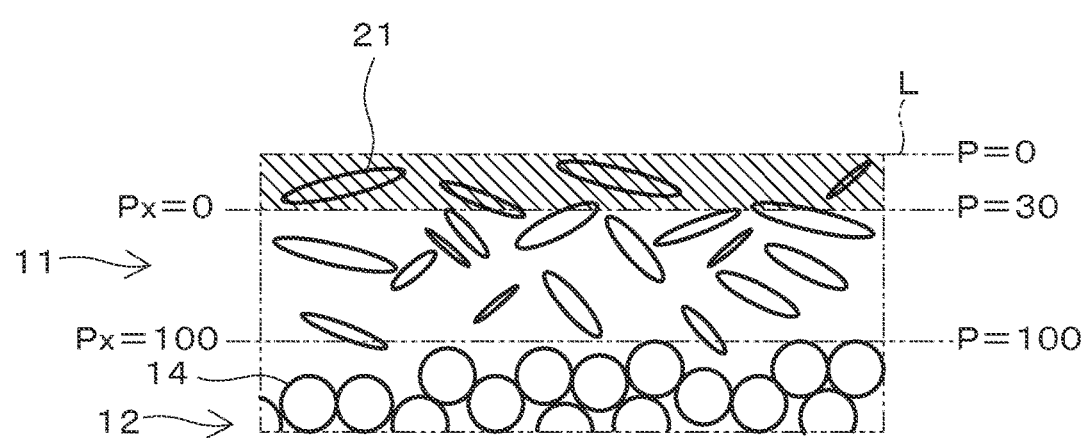
FIG. 10 is a schematic view for describing a case of removing the resin layer up to a region where the resin depth position P is 30 (P=30) in the sliding member according to the embodiment.

In Examples 12 to 16 shown in FIG. 9, the formed resin layer 11 was removed up to a position where the resin depth position P is 30 (P=30) and was used in the test. In other words, in Examples 12 to 16, the resin layer 11 was removed up to P=30 and the position (P=30) was redefined as Px=0, as shown in FIG. 10. The sliding member 10 is not only used as it is after the resin layer 11 is formed, but may also be used in a state where the resin layer is partially removed in the thickness direction as in Examples 12 to 16. In other words, the exposure of the rich regions 21 at the sliding surface 16 is promoted in the sliding member 10 by the partial removal of the resin layer 11. In this way, the coefficient of friction can be reduced at an early stage by the exposure of the rich regions 21 at the sliding surface 16.

The configurations of Examples 12 to 15 shown in FIG. 9 are similar to that of Example 1 shown in FIG. 8 using the calcium fluoride as the additive, and are different in the observation field of view from Example 1. In addition, the configuration of Example 16 is similar to that of Example 4 using the barium sulfate as the additive, and is different in the observation field of view from Example 4. Further, as shown in FIGS. 10 and 11, in Examples 12 to 16, the resin layer 11 is removed up to the position where the resin depth position P is 30 (P=30), and the position where the resin depth position P is 30 (P=30) is redefined as the Px=0. FIG. 11 also shows conversion values of the resin depth position P and the resin depth position Px.

Figure 12:
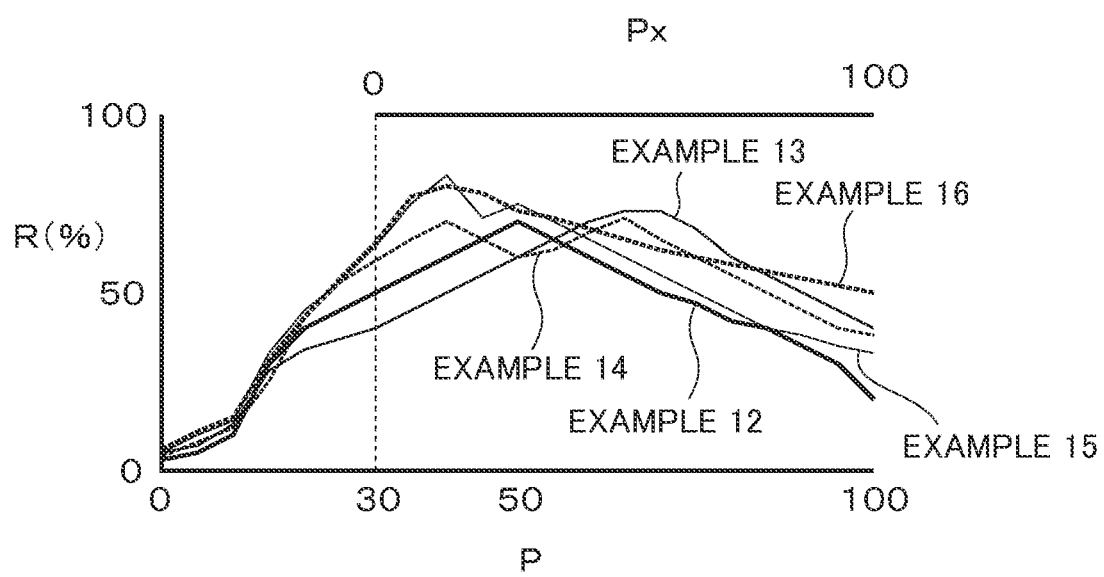
FIG. 12 is a graph created based on FIG. 11.

In Examples 12 to 16, as shown in FIGS. 9 to 12, the rich region proportion R (%) is larger than the value Rh at P=100 in the range where the resin depth position P is other than P=100. In Examples 12 to 16, the rich region proportion R (%) has the maximum value Rp when the resin depth position P is 40≤P≤70. In the case of Example 12, for example, the maximum value Rp of the rich region proportion R (%) is R (%)=70 when the resin depth position P is 50 (P=50), and is larger than R (%)=20 at P=100. The same applies to Examples 12 to 16. In Example 14, there are two peaks of R (%)=70 when the resin depth position P is 40 (P=40) and R (%)=71 when the resin depth position P is 65. As described above, the rich region proportion R (%) may have two or more peaks in relation to the resin depth position P. In such Examples 12 to 16, as shown in FIGS. 11 and 12, the rich region proportion R (%) differs depending on the resin depth position P. In other words, the distribution of the rich region proportion R (%) occurs in the thickness direction of the resin layer 11 in Examples 12 to 16. In such Examples 12 to 16, it is possible to further reduce the coefficient of dynamic friction while maintaining the wear resistance. Such distribution of the rich region proportion R (%) is not limited to the case of cutting up to P=30 as in each example described above, and shows the same tendency regardless of the cutting amount. In other words, regardless of the cutting amount of the resin layer 11, the rich region proportion R (%) has the maximum value Rp larger than the value Rh at P=100 in the range other than P=100.

In the sliding member 10 of the present embodiment described above, the resin layer 11 includes the rich regions 21 having a higher concentration of PTFE than other regions. The resin layer 11 includes the plurality of rich regions 21 formed in the thickness direction of the resin layer 11. In other words, in the present embodiment, the resin layer 11 includes a plurality of regions where the concentration of PTFE changes in the thickness direction. Thus, the rich regions 21 having a high concentration of PTFE contribute to the reduction of the coefficient of friction which is an inherent performance of PTFE. The rich regions 21 each have a high concentration of PTFE, thereby greatly reducing the coefficient of friction. On the other hand, the resin layer 11 other than the rich regions 21 richly contains the additive rather than the PTFE. Therefore, the resin layer 11 other than the rich regions 21 contributes to the improvement of the strength of the resin layer 11. In the present embodiment, the PTFE and the additive are unevenly distributed in the resin layer 11 by intent, and thus the region of PTFE of light and shade is formed. Then, both the reduction of the coefficient of friction and the wear resistance are appropriately achieved by the intentional region of PTFE of light and shade. Therefore, the performance of the resin layer 11 can be sufficiently exhibited, and both the reduction of the coefficient of friction and the wear resistance can be achieved at the same time.

In the sliding member 10 of the present embodiment, the rich regions 21 included in the resin layer 11 contain the PTFE with a high concentration. The PTFE has low conductivity and is easily charged. Therefore, it is possible to control electrical characteristics such as the conductivity of the sliding member 10 by the control of the rich regions 21 included in the resin layer 11. Accordingly, it is possible to control the electrical characteristics required for the sliding member 10 according to the device to be applied. In the sliding member 10 of the present embodiment, a large number of discontinuous and complicated boundaries are formed in the resin layer 11 by the rich regions 21. In the sliding member 10 of the present embodiment, accordingly, complicated boundaries are formed between the rich regions 21 and other regions in the resin layer 11. For this reason, by the complicated boundaries, a force applied to the resin layer 11 is appropriately dispersed, and a stress in the resin layer 11 is also relaxed. As a result, the pulling direction of the resin layer 11 and the resistance to peeling are improved. Therefore, the strength of the resin layer 11 can be improved.

The present invention described above is not limited to the above-described embodiment, and can be applied to various embodiments without departing from the gist thereof.

In Examples 12 to 16, a step width of the resin depth position P used for calculating the rich region proportion R (%) was set to "5". However, the step width of the resin depth position P is not limited to "5". In other words, the step width of the resin depth position P can be arbitrarily changed within a range in which the tendency of the distribution of the rich region proportion R (%) can be seen in the thickness direction of the resin layer 11.

What is claimed is:

1. A sliding member comprising a resin layer that slides with a mating member, wherein
the resin layer contains polytetrafluoroethylene and an additive spread throughout the resin layer, and
the resin layer includes a plurality of rich regions having a high concentration of the polytetrafluoroethylene, and a plurality of other regions having a lower concentration of the polytetrafluoroethylene than the plurality of rich regions, and
the plurality of rich regions and the plurality of other regions are formed in a thickness direction of the resin layer, both the plurality of rich regions and the plurality of the other regions mainly composed of the polytetrafluoroethylene, and an additive contained in the rich regions having a particle size of 5 µm or less,
when an arbitrary observation field of view is set in a cross section in a plate thickness direction perpendicular to a sliding direction of the mating member in the resin layer,
a resin depth position P is defined in which an end on the mating member is set to 0 and an end on an opposite side is set to 100 in the thickness direction of the resin layer in the observation field of view, and
a virtual straight line L is set to be perpendicular to the thickness direction of the resin layer at the resin depth position P in the observation field of view, a total length of the resin layer on the virtual straight line L is defined as D1, a total length of the rich regions on the virtual straight line L is defined as D2, and a rich region proportion R (%) is defined as $R=D2/D1\times100$,
the rich region proportion R (%) differs depending on the resin depth position P.

2. The sliding member according to claim 1, wherein the resin layer contains 10 to 50 vol % of the rich regions.

3. The sliding member according to claim 1, wherein the resin layer includes the rich regions formed in layers in the thickness direction of the resin layer.

4. The sliding member according to claim 1, wherein when an arbitrary observation field of view is set in a cross section in a plate thickness direction perpendicular to a sliding direction of the mating member in the resin layer,
an average value of aspect ratios of the rich regions is 10 to 65.

5. The sliding member according to claim 4, wherein each of the rich regions has a minor axis and a major axis perpendicular to the minor axis in the observation field of view, and
the minor axis has a length of 0.7 to 32 µm.

6. The sliding member according to claim 1, wherein the rich region proportion R (%) is larger than a value at P=100 in at least a part of a range where the resin depth position P is 0<P<100.

7. The sliding member according to claim 6, wherein the rich region proportion R (%) has a maximum value in a region where the resin depth position P is $40 \leq P \leq 70$.

8. A method of manufacturing the sliding member according to claim 1, the method comprising:
a step of forming the resin layer including the rich regions; and
a step of removing at least a part of the formed resin layer in the thickness direction from an end surface.

* * * * *